April 28, 1925.

E. LATSHAW

CAR TRUCK

Filed Nov. 15, 1923

INVENTOR
Elmer Latshaw
BY
his ATTORNEY

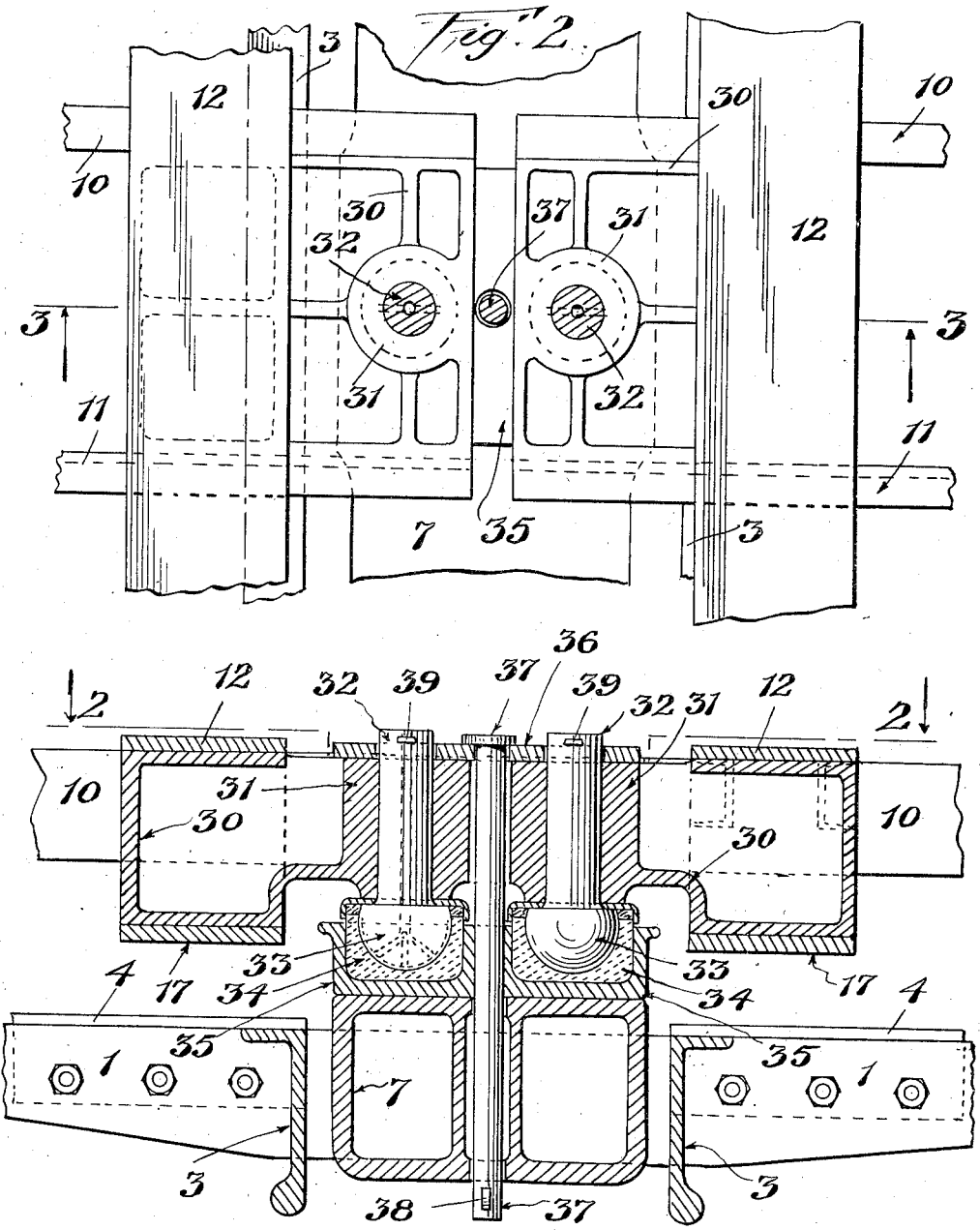

April 28, 1925.
E. LATSHAW
CAR TRUCK
Filed Nov. 15, 1923
1,535,229
6 Sheets-Sheet 3
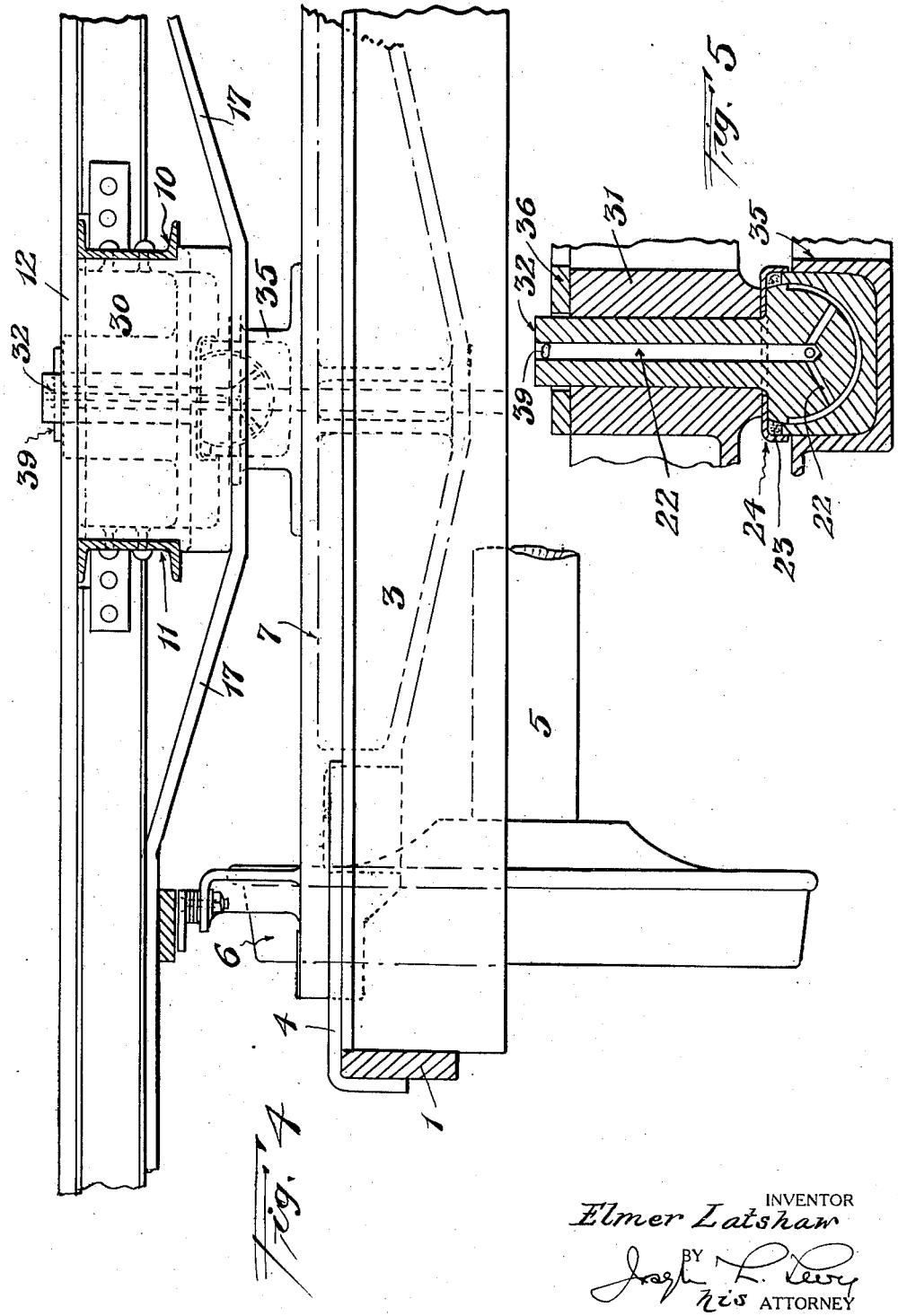

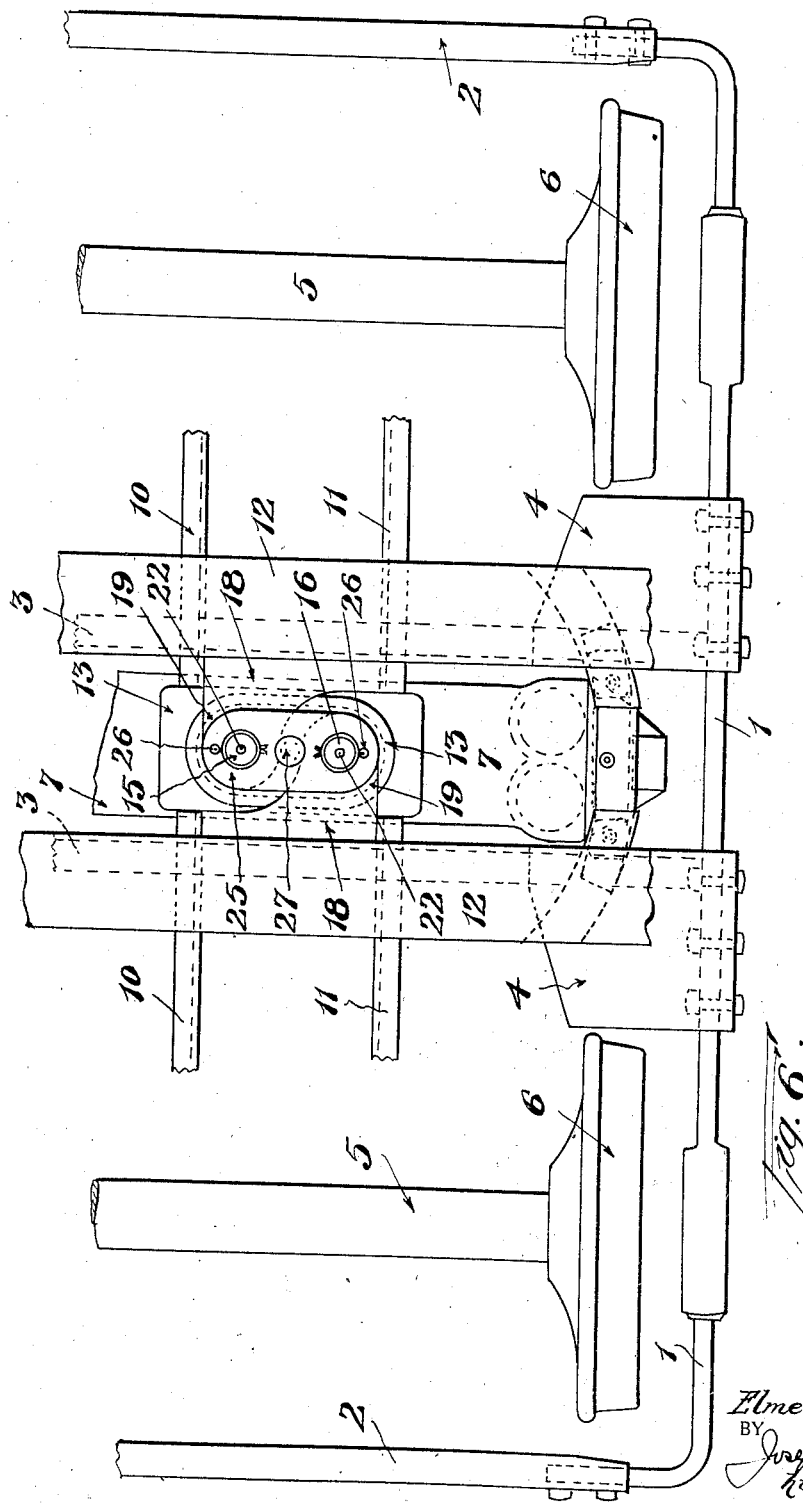

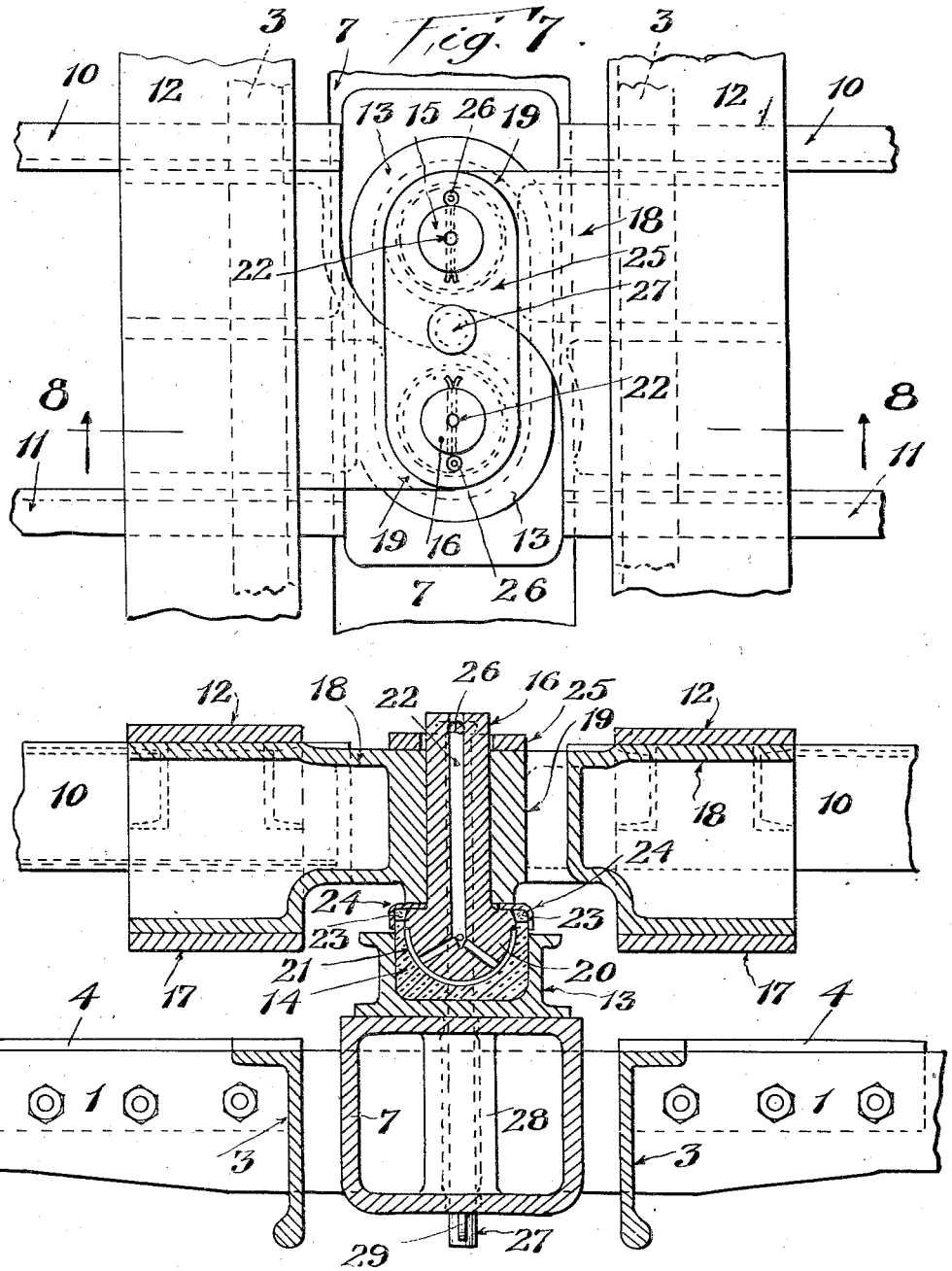

April 28, 1925.
E. LATSHAW
CAR TRUCK
Filed Nov. 15, 1923
1,535,229
6 Sheets-Sheet 6
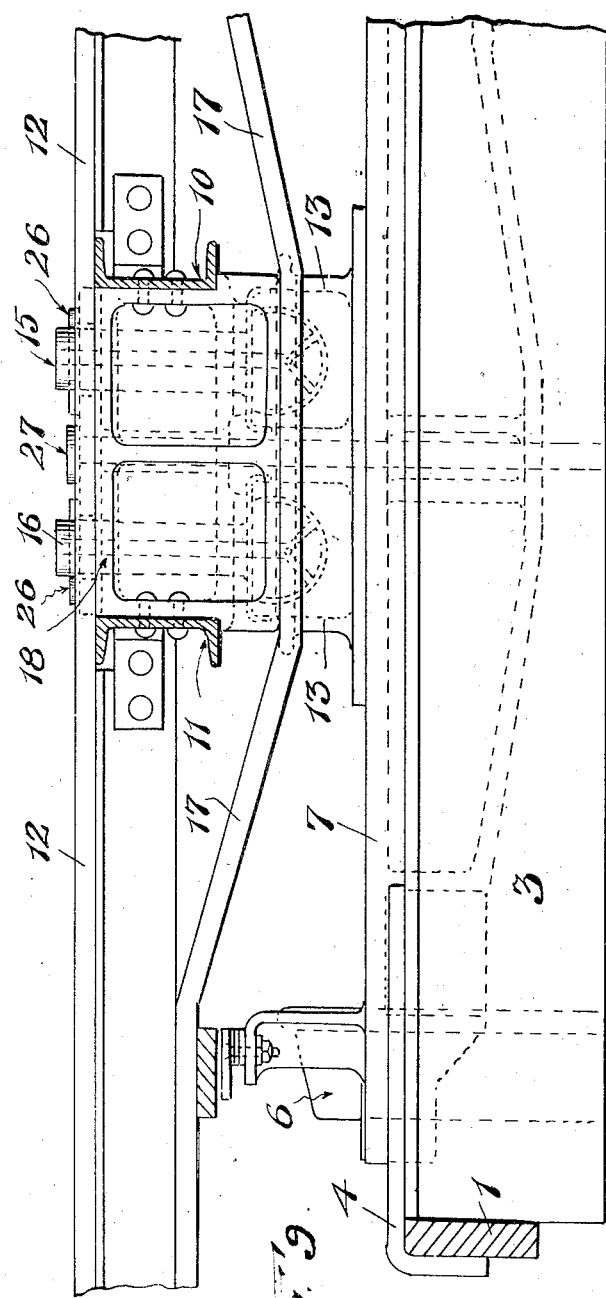
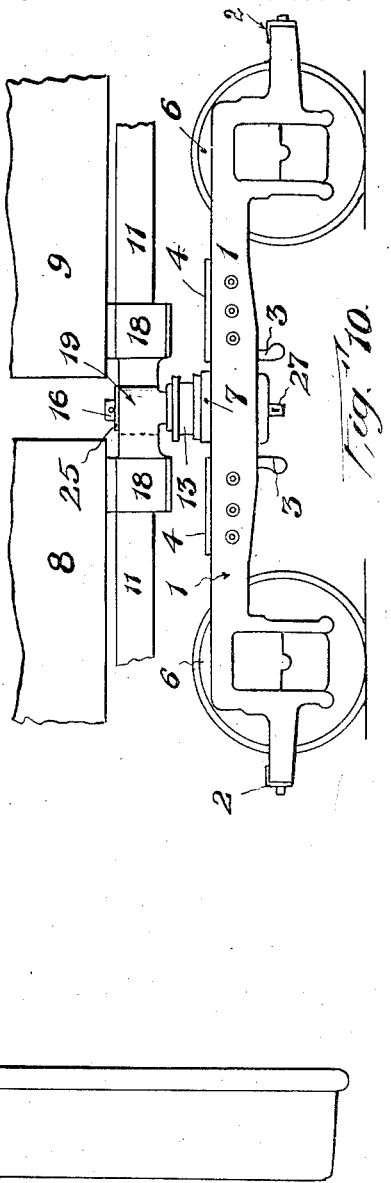
INVENTOR
Elmer Latshaw
BY
his ATTORNEY Patented Apr. 28, 1925.

1,535,229

UNITED STATES PATENT OFFICE.

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR TRUCK.

Application filed November 15, 1923. Serial No. 674,856.

*To all whom it may concern:*

Be it known that I, ELMER LATSHAW, a citizen of the United States, and a resident of the city and county of Philadelphia, State of Pennsylvania, have invented a new and useful Improvement in Car Trucks, of which the following is a specification.

This invention relates to a truck intended for supporting the ends of two car bodies, as is the practice in "articulated" cars; and has for its object to provide a truck and body mounting for the ends of the cars in which the ends of the cars are provided with pivotal points located on opposite sides of the center of the truck, which pivots are independent of each other whereby a car body can be readily removed from its connection to the truck without disturbing the attachment of the other to the truck.

It has been the practice in the past to support both ends of the bodies on a single centrally located pivotal support on the truck. The disadvantage of this construction resides in the fact that it necessitates making the ends of the cars of different shape, and also that one car cannot be detached from the truck without disturbing the connection of the other to the truck. The improvements described herein enables the ends of the cars to be similar in design and one car can be readily detached from the truck without disturbing the connection of the other car.

With these objects, and such other objects which may hereinafter appear, in view, I have devised the particular arrangement of parts set forth below and more particularly pointed out in the claims appended hereto.

Reference is to be had to the accompanying drawing, forming a part hereof, in which Figure 1 is a plan view of a portion of the truck and parts of the car bodies, including the pivotal connections of the bodies to the truck;

Figure 2 is a plan view of a portion of the truck bolster and parts of the car bodies, showing the pivotal connections between the bolster and the bodies, parts being shown in section, said section being taken on the line 2—2 of Figure 3, looking in the direction of the arrows;

Figure 3 is a sectional view on the line 3—3 of Figure 2, looking in the direction of the arrows;

Figure 4 is a transverse section of a portion of the truck and one of the car body frames, showing the connection thereto with the truck;

Figure 5 is a vertical sectional view of one of the pivot bolts which connects the car body with the truck bolster;

Figure 6 is a plan view of a portion of a truck and car body frame, showing a modified form of construction;

Figure 7 is a plan view of portions of the car body frame shown in Figure 6;

Figure 8 is a sectional view on the line 8—8 of Figure 7, looking in the direction of the arrows;

Figure 9 is a transverse section of the car truck and parts of the car body frame shown in Figures 6, 7 and 8; and Figure 10 is a side elevation of one of the trucks shown in Figures 6 to 9 inclusive, showing its position relative to the ends of the car bodies.

Throughout the various views of the drawings, similar reference characters designate similar parts.

Figure 1:
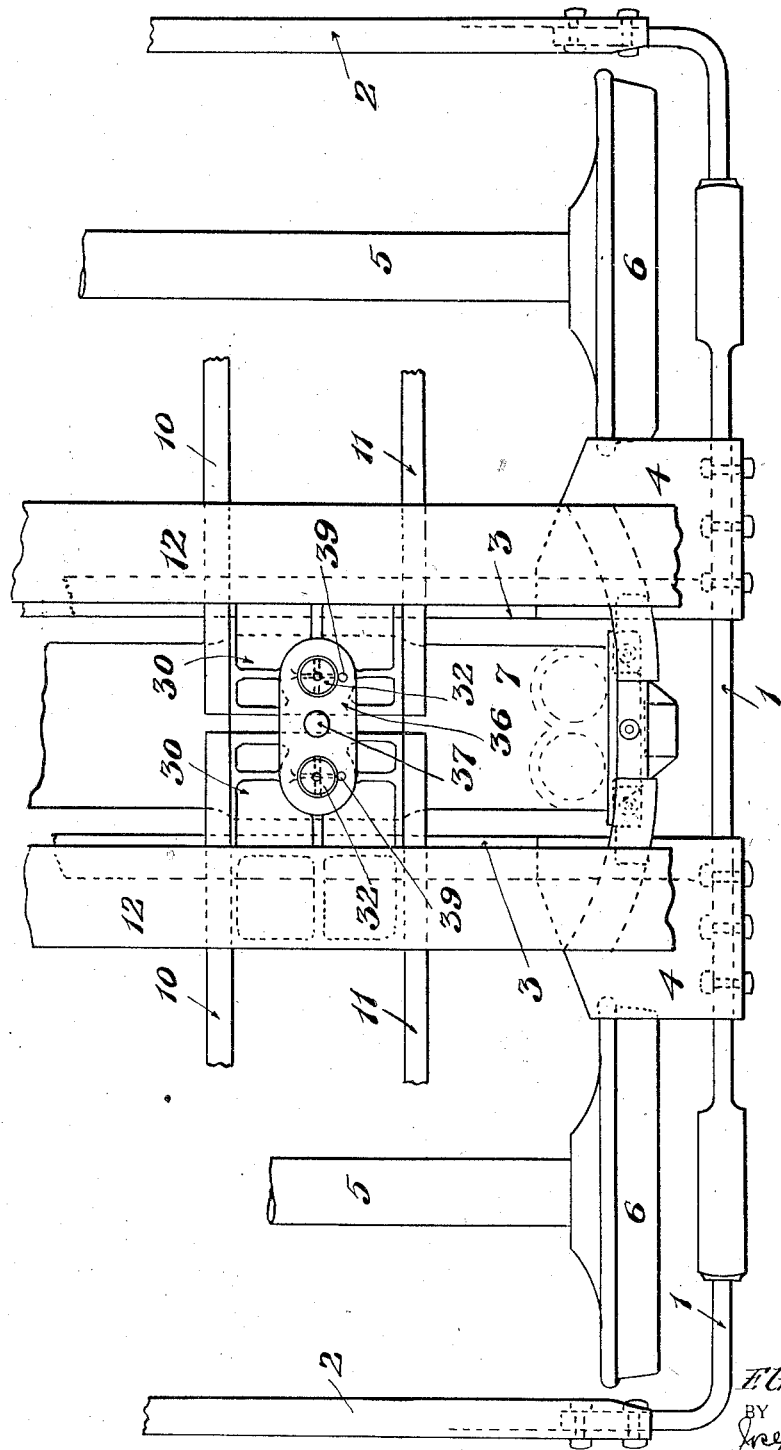

In the embodiment of my invention as disclosed in Figures 1 to 5 inclusive, 1 indicates one of the side frames of the truck, a similar side frame being located at the opposite side of the truck, and both of the side frames are connected by the end braces 2.

At 3 are shown transverse braces which unite the side frames, and at 4 are shown gusset plates which connect said braces with the side frames and generally reinforce the truck frame.

At 5 are shown the axles and at 6 are the wheels.

All of the foregoing parts are conventional elements of truck construction.

The truck bolster is shown at 7 and the same is suitably spring suspended on the truck in any desired well known manner. The ends of two cars are supported upon this bolster and are arranged to pivot thereon as will now be described.

At 10 and 11 is shown a pair of longitudinally disposed parallel frame members on the lower end or bottom of each of the car bodies, and at 12 is shown a transverse frame member on the underside of the car body.

At 35 is shown a bearing member which is secured on top of the truck bolster 7 and which is provided with a pair of bearing blocks 34 suitably recessed to receive the ends of pivot pins 32.

Located between the car body frame members 10 and 11 and secured to said frame members and also to the frame member 12, and to a lower frame member 17 is a bracket 30. Said bracket is provided with a boss 31 in which is a perforation which receives a pivot pin 32 having its lower end terminating in a half ball 33 which rests and freely moves in corresponding recesses provided in the bearing block 34 which is held in the bearing 35 on top of the truck bolster 7.

A plate 36 connects the two brackets 30 and a pin 37 passes through said plate and between the ends of the brackets, through the bearings 35 and through the bolster 7. A split pin 38, which extends through the lower end of the pin 37, holds the same in place. Split pins 39 passing through the upper ends of the pivot pins 32 hold the parts in position. It will be seen from the foregoing that by the removal of the pin 37 and the removal of the split pin 39 from the pivot pin from which it is desired to remove the car, the car can be readily removed without disturbing the connection of the other car with the truck.

In the embodiment of my invention disclosed in Figures 6 to 10 inclusive, the parts 1 to 12 and 17 are similar to those referred to previously. This embodiment of my invention is shown in Figure 10 in conjunction with the ends of the two car bodies which it supports, wherein the car bodies are indicated at 8 and 9.

At 13 is shown a bearing member which is secured on top of the truck bolster 7 and which is provided with a bearing block 14 which receives suitable pivot pins 15 and 16.

Located between the car body frame members 11 and 10 and secured to said frame members and also to the frame member 12 and to the lower frame member 17 is a bracket 18 which is provided with an ear 19 through which the pivot bolt 15 passes. The lower end of the pivot bolt 15 terminates in a ball as at 20 and said end 20 is received in a recess 21 provided in the bearing block 14. The bolt 15 is provided with vertical and diagonal oil holes 22 which act as oil retainers for lubricating the ball and socket pivot. A suitable packing 23, held on the bearing block by a cover plate 24 acts to keep the dust from the ball and socket joint.

The pivot pin 16 is similar in all respects to the pin 15 and the said pin 16 extends through a similar bracket 18 on the opposite car body. The ears 19 on both brackets are located towards the opposite sides so that the pivot pins 15 and 16 are located on the transverse center line of the truck but are on opposite sides of the longitudinal center line of the truck.

At 25 is a plate which lies on top of the two brackets 18 and split pins pass through the bolts 15 and 16 to hold the plate in position. A pin 27 passes through said plate 25 and between the two brackets 18, through the bearing members 13 and 14 and through the bolster 7, said bolster having a boss 28 through which the pin 27 extends. A split pin 29 passes through the lower end of the pin 27 to hold the same in position. The bolt 27 holds the various parts together, that is, it holds down the brackets 18 on top of the bearing block 14 and also holds the half ball ends of the pivot pins in the recesses provided for them in the bearing block 14.

From the foregoing, it will be understood that since separate pivot pins are provided for the ends of each car body, one car can be readily removed from the truck by removing the center pin 27 and then removing the car from its pivot, without disturbing the other car attached to the truck.

In the embodiment of my invention disclosed in Figures 1 to 5 the pivotal connections of the car bodies with the truck are located on opposite sides of the transverse center line of the truck and in line with the longitudinal center line of the truck. The embodiment shown in Figures 6 to 10 inclusive provides the pivotal connection on opposite sides of the longitudinal center line of the truck and in alignment with the transverse center line of the truck.

From the foregoing, it is obvious that my invention is not to be restricted to the exact embodiments shown, but is broad enough to cover all structures coming within the scope of the annexed claims.

What I claim is:

1. A mechanism of the class described comprising a car truck, a pair of car bodies having their ends supported on said truck, a pair of spaced pivot pins for connecting said car bodies with the truck, each of said pins having its lower end terminating in a ball-shaped member, a truck bolster, and a bearing member on said bolster for receiving the ball-shaped portions on the ends of the pivot pins.

2. A mechanism of the class described comprising a car truck having a truck bolster, a bearing supported on the same, recesses in said bearing, a pair of pivot pins having their lower ends supported in said recesses, car body extensions through which said pivot pins extend, a plate over said car body extensions, and a pin extending through the plate, the bearing and the bolster.

3. A mechanism of the class described comprising a car truck having a truck bolster, a pair of car bodies having their ends supported thereon, pivot pins connecting the ends of said car bodies with the bolster, a plate over the ends of said pivot pins and a pin located between said pivot pins extending through said plate and through the bolster.

Signed at the city and county of Philadelphia, State of Pennsylvania, this 13th day of November, 1923.

ELMER LATSHAW.